Jan. 3, 1933.  A. SCHMID  1,893,447
PROCESS OF AND APPARATUS FOR NITRATING GLYCERINE,
GLYCOL, AND SIMILAR ALCOHOLS
Filed Jan. 25, 1928
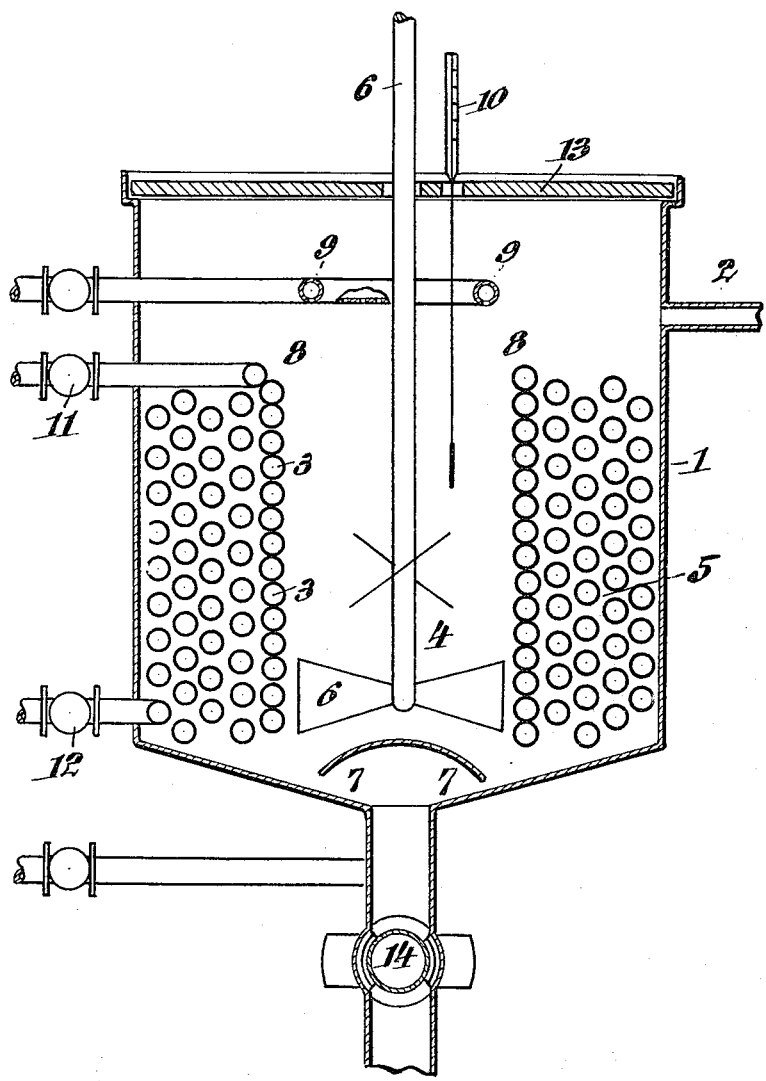
A. Schmid
INVENTOR
By: Marks & Clerk
Attys.

Patented Jan. 3, 1933

1,893,447

UNITED STATES PATENT OFFICE

ARNOLD SCHMID, OF VIENNA, AUSTRIA; HANS SCHMID AND IRMA SCHMID, ADMINISTRATORS OF SAID ARNOLD SCHMID, DECEASED, ASSIGNORS TO KARL SCHMID, OF MANNHEIM, GERMANY

PROCESS OF AND APPARATUS FOR NITRATING GLYCERINE, GLYCOL, AND SIMILAR ALCOHOLS

Application filed January 25, 1928, Serial No. 249,473, and in Germany February 5, 1927.

This invention relates to a process of nitrating glycerine, glycol and similar alcohols, which warrants a higher efficiency of the apparatus as employed, e. g. it permits the use of nitration apparatus of a considerably smaller size although the efficiency remains the same. This is not only an economical advantage (saving of money, space and repairs), but also a question of increased safety, because the danger of an explosion, which always has to be reckoned with in a nitroglycerine plant, is reduced in accordance with the smaller size and contents of the apparatus.

A consequence of this tendency to reduce the size of the apparatus or increase its efficiency is the use of cooling machines in nitroglycerine plants at present in use and furthermore the aim to carry out the process of nitration in a continuous operation, as has been proposed already.

However the known continuous processes are not satisfactory and therefore are not in use. These known processes do not completely exclude a local superheating at the portion of the apparatus where the glycerine and nitrating acid meet each other, so that the output is not very favorable and furthermore the operation is endangered, because a disintegration of the entire contents may start at these places. Furthermore in the known processes coils are usually employed between which the reaction mixture is mixed by stirring. Of course these coils have to be spaced apart for a considerable distance in order to provide for a uniform mixing of the entire contents and so that the zone of reaction is not confined to the place of admission of the glycerine.

In the process according to the present invention thin films of the reaction fluid are utilized between the cooling faces and therefore, compared with the size and contents of the known apparatus, the efficiency of the apparatus according to the present invention is considerably increased and any local superheating or disintegration is rendered impossible.

The nitration apparatus according to the present invention does not consist of a single compartment as heretofore, but comprises two separate compartments, a cooling chamber and a mixing chamber, through which quickly and always in the same direction the reaction mixture passes, so that the said mixture is led in a circular course. The mixing chamber alone carries one operation of the apparatus, viz., the thorough and immediate mixing of the supplied glycerine with the acid present, while the cooling chamber serves for leading off the generated heat.

The intermediate spaces of the cooling faces are very small and a whirling motion between the same need not take place, because mixing is not necessary in the cooling chamber and an already homogeneous completely nitrated mixture enters the latter. As cooling faces, either the inner or outer walls of coils may be utilized. However, the cooling members may be of any other convenient shape. The reaction medium is forced by means of a uniformly directed pressure through the said intermediate spaces and therefore the latter can be narrow.

The mixture cooled in the cooling chamber to a temperature below the operating temperature is led back into the mixing chamber and therein is thoroughly admixed with the glycerine. Thereby it takes up the entire reaction-heat and positively prevents any superheating in the mixing chamber, because it leads the necessary coolness from the cooling chamber into the mixing chamber. A thorough stirring can take place because no obstacles, for instance coils, are present, so that local temperature-differences cannot arise.

The reaction-mixture in the apparatus serves as transmitter of coolness, because during its passage through the apparatus it is alternately cooled in the cooling chamber and again heated by the reaction in the mixing chamber. Thereby the temperature-difference between the inlet and outlet of the mixing chamber can be kept as small as desired by intensifying the circulation.

A single apparatus, for instance a compressed air injector or a screw-stirrer, may be employed for performing the mixing operation and the passage of the fluid. However if desired also separate apparatus may be used for these purposes.

The process is adapted for interrupted as well as for continuous operation.

It is a fact, that whirls and local circular courses are caused by the stirring operation in any glycerine-nitration apparatus and promote the exchange of heat. However the circular course according to the present invention differs considerably from this, as the same permanently circulates in the same direction between two separated compartments. Further the circulation is increased as much as possible.

It has already been proposed to divide the apparatus into two compartments but for quite another purpose. In this case a circular course is not followed between these two compartments, but through the latter passes the reaction mixture once only.

An apparatus adapted for continuous nitration is illustrated diagrammatically and by way of example in the drawing.

The vessel 1 is charged with an emulsion of nitroglycerine and residuary acid up to the overflow pipe 2. The innermost coil 3, the windings of which contact with one another, separates the inner mixing chamber 4 from the outer cooling chamber 5. The propeller-stirrer 6 causes a thorough mixing in the mixing chamber and at the same time promotes a good circulation of the contents over the cooling coils. By way of openings 7 the nitrating acid is continuously added to the reaction liquid and passes at 8 together with the same over the coils and into the mixing chamber in a somewhat cooled condition and substantially diluted by the reaction mixture. Before returning into the mixing compartment, a quantity of this reaction-mixture corresponding to the quantity of the introduced raw-materials, is run off by way of the overflow 2, which overflow maintains in vessel 1 a constant liquid-surface. The glycerine enters through the pipe 9 and commingles with the acid overflowing at 8, so that the initial condition of the reaction-mixture is re-established by the reaction now taking place in the mixing chamber. 10 designates a thermometer, 11 and 12 are the connecting means for the cooling medium, 13 designates a glass-plate permitting the process to be watched, and 14 indicates a safety valve for emptying apparatus in event of the danger of disintegration.

I claim:—

1. A process of continuously nitrating glycerine, glycol and similar alcohols, which consists in causing the alcohol to be nitrated to react in a previously cooled mixture of already nitrated alcohol and nitrating acid, supplying additional acid and recooling the reaction mixture and finally removing a portion of the latter and repeating the cyclic process.

2. A process of continuously nitrating glycerine, glycol and similar alcohols according to claim 1, which consists in adding the alcohol to be nitrated and the nitrating acid to a circulating mixture of nitrated alcohol and nitrating acid and thoroughly mixing the circulating mixture with the added substances, subsequently cooling the mixture whereupon a part of the mixture flows away and another part continues the cyclic process.

In testimony whereof I affix my signature.

ARNOLD SCHMID.